United States Patent

Fomison

(10) Patent No.: US 9,989,143 B2
(45) Date of Patent: Jun. 5, 2018

(54) SHROUD ASSEMBLY

(71) Applicant: ROLLS-ROYCE PLC, London (GB)

(72) Inventor: Neil Robert Fomison, Derby (GB)

(73) Assignee: ROLLS-ROYCE PLC, London (GB)

( * ) Notice: Subject to any disclaimer, the term of this patent is extended or adjusted under 35 U.S.C. 154(b) by 398 days.

(21) Appl. No.: 14/878,612

(22) Filed: Oct. 8, 2015

(65) Prior Publication Data

US 2016/0131243 A1    May 12, 2016

(30) Foreign Application Priority Data

Nov. 7, 2014 (GB) .................................. 1419812.1

(51) Int. Cl.
*F16H 57/038* (2012.01)
*F16H 57/04* (2010.01)
*F01D 25/18* (2006.01)

(52) U.S. Cl.
CPC ....... *F16H 57/0409* (2013.01); *F16H 57/038* (2013.01); *F16H 57/0424* (2013.01); *F01D 25/18* (2013.01); *F05D 2260/4031* (2013.01)

(58) Field of Classification Search
CPC .... F16H 1/14; F16H 57/0421; F16H 57/0423; F16H 57/0409; F16H 57/038; F02C 7/32
USPC .................. 74/467, 468; 184/6.12
See application file for complete search history.

(56) References Cited

U.S. PATENT DOCUMENTS

| | | | | |
|---|---|---|---|---|
| 1,365,438 A * | 1/1921 | Adamson | ........... | F01M 11/0004 74/606 A |
| 3,276,289 A * | 10/1966 | Cox | ........... | B61C 17/08 74/606 R |
| 4,347,759 A * | 9/1982 | Renk | ........... | F16N 7/28 74/606 R |
| 4,470,324 A * | 9/1984 | Renk | ........... | F16H 57/0423 277/409 |
| 5,048,370 A * | 9/1991 | Duello | ........... | F16H 57/0423 74/421 R |
| 6,467,578 B1 * | 10/2002 | Winfree | ........... | F16H 57/0456 184/6.12 |
| 8,109,174 B2 * | 2/2012 | Hilker | ........... | F16H 57/0421 184/6.12 |
| 8,517,147 B2 * | 8/2013 | Imai | ........... | F16H 57/0493 184/6.12 |
| 2006/0054408 A1 | 3/2006 | Swainson | | |
| 2010/0140019 A1 | 6/2010 | Imai et al. | | |

(Continued)

OTHER PUBLICATIONS

Apr. 30, 2015 Search Report issued in British Patent Application No. 1419812.1.

*Primary Examiner* — William C Joyce

(74) *Attorney, Agent, or Firm* — Oliff PLC

(57) ABSTRACT

A bevel gear shroud assembly comprises a frustum shaped shroud portion, first and second rib portions and one or more fin portions. The frustum shaped shroud portion has a cut-out sector, the cut-out sector having opposing, radially extending first and second sides. The first and second rib portions project inwardly from an upper base of the shroud frustum and normal to the inner surface of the shroud portion, and are spaced apart from one another to form an annular trough therebetween. The or each rib portion projects inwardly from an inner surface of the frustum shaped shroud portion between the first and second rib portions, and the or each rib portion extends circumferentially around the shroud portion.

9 Claims, 6 Drawing Sheets

(56) References Cited

U.S. PATENT DOCUMENTS

2013/0180803 A1\* 7/2013 Tanaka ................ F16H 57/0409
184/6.12

\* cited by examiner

SHROUD ASSEMBLY

This disclosure claims the benefit of UK Patent Application No. GB 1419812.1, filed on 7 Nov. 2014, which is hereby incorporated herein in its entirety.

FIELD

The present disclosure relates to a bevel gear shroud assembly and particularly, but not exclusively, to a bevel gear shroud assembly for a gas turbine engine.

BACKGROUND

It is known to employ a gear shroud over rotating bevel gears systems in engine bearing chambers, an example of which is shown in FIGS. 1 to 3. Such gear shrouds are intended minimise the pumping losses from the gears and hence reduce the level of heat generated within the bearing chamber.

Common gear shroud designs operate by limiting the ability of the gears in the gear system to do work on the general air-oil mixture in the bearing chamber by employing restricted inlet and exit areas (i.e. by throttling at the inlet and exit of the shroud). In this way, the quantity of air-oil mixture induced through the shroud may be minimised.

The air-oil mixture that is entrained by the gear system primarily passes along the gear teeth and takes a spiral type route (i.e. with both circumferential and azimuthal velocity components) through the gear-shroud system.

The surface of the gear shroud is usually primarily conic both for simplicity of manufacture and to maintain a uniform clearance over the gear teeth (to avoid highly undesirable mechanical gear to shroud clashes at extreme limits of gear setting and/or thrust bearing internal clearance levels).

In addition to the main inlet and exit areas, some means is also usually provided to scavenge away the gear mesh lubricating oil which is normally introduced from a dedicated oil jet upstream of the mesh point (so called 'into mesh' lubrication). An effective scavenge arrangement for the lubricating oil is a slot which extends for the full length of the gear face width and is usually positioned approximately 30 deg past the gear mesh point.

A disadvantage of the prior art is that any oil which does not exit via the intended slot may be caught under the shroud and recirculate within the shroud as shown in FIG. 3. This recirculation arises primarily as a result of the above-mentioned large clearance between gear tooth tip and gear shroud.

The region of flow recirculation commonly extends over the entire width of the face of the gear, from almost the shroud inlet to almost the shroud exhaust. This large recirculation flow region is undesirable as it can result in locally excessive oil temperatures resulting from the heat generated by the additional pumping work of the gear system.

Such locally excessive oil temperatures may result in oil degradation (or even combustion) and the possible requirement for the provision of additional oil coolers in an engine heat management system where the oil system is essentially closed.

OBJECTS AND STATEMENTS

According to a first aspect there is provided a bevel gear shroud assembly comprising:
  a frustum shaped shroud portion having a cut-out sector;
  first and second rib portions; and
  one or more fin portions,
  wherein the first and second rib portions project inwardly from and normal to, an inner surface of the shroud portion, the first rib portion being positioned at an upper base of the shroud portion, and the second rib portion being positioned at a lower base of the shroud portion, and
  the or each fin portion projects inwardly from the inner surface of the shroud portion between the first and second rib portions, and the or each fin portion extends around the shroud portion.

The arrangement of the disclosure replaces the conic inner surface of a conventional bevel gear shroud with a ridged or finned surface where the ridges or fins run circumferentially around an inner surface of the shroud. The dimensions of the fins are such that the required existing minimum gear to shroud mechanical clearance is maintained.

In one arrangement of the disclosure, the bevel gear shroud assembly comprises three fin portions. In other arrangements, the number of fins may be one, two or more than three.

The fin portions act to guide the air-oil mixture in a circumferential direction through the gear shroud. The air-oil mixture entering the gear shroud travels circumferentially around the shroud portion before exhausting at the cut-out sector.

In this way, the work done by the gear system on the entrained oil is reduced. This in turn reduces the heat input to the oil thereby increasing the service life of the oil.

Consequently the work done by the gear on the recirculating oil and heat input to the oil is reduced.

A further advantage of the present arrangement is that gear mesh lubrication is improved through a more even distribution of oil across the width of the face of the gear (especially if an out of mesh lubrication system is used) should any oil remain under the shroud immediately upstream of the meshing region.

A still further advantage of the present arrangement is the improvement in shroud mechanical stiffness resulting from the presence of the rib portions. This enables the weight of the shroud assembly to be reduced relative to the known shroud assembly designs.

Optionally, the or each fin portion projects normally from the inner surface of the shroud portion.

By projecting normally from the inner surface of the shroud portion, the fin portions define a rectangular cross-section for the space between adjacent fin portions, which minimises flow losses in the space.

Optionally, the or each fin portion projects from the inner surface of the shroud portion at an acute angle to the inner surface, and is angled towards a lower base of the shroud portion.

By inclining the fin portions relative to the inner surface of the shroud, the shroud assembly provides increased resistance to flow crossing over a fin portion due to the fluid diode action of the angled fin portions.

Optionally, the or each fin portion projects from the inner surface of the shroud portion, and curves towards a lower base of the shroud portion.

A curved profile to the or each fin portion provides for a smoother flow of oil to the shroud exhaust regions and away from the gear inlet.

Optionally, the or each fin portion extends circumferentially around the inner surface of the shroud portion.

In one arrangement, the or each fin portion extends around the entire inner surface of the shroud portion. In this way, the air-oil mixture is guided completely through the shroud portion so minimising the residence time of the air-oil mixture in the shroud assembly.

In other arrangements, the or each fin portion may extend only partially around the inner surface of the shroud portion.

Optionally, the or each fin portion extends spirally around the inner surface of the shroud portion.

In one arrangement of the shroud assembly, the fin portions are arranged in a spiral configuration with each annular trough having an inlet around the circumferential periphery of the shroud portion and exhausting into the cut-out sector. In this way, air-oil mixture drawn into the gear system around the periphery of the shroud assembly may be guided through the shroud assembly and exhausted at the cut-out sector.

Optionally, the or each fin portion is provided with at least one exit port extending through a wall of the shroud portion.

In one arrangement, each fin portion is provided with a plurality of exit ports each extending through a wall of the shroud portion. These exit ports are arranged circumferentially around the shroud portion. In this way, air-oil mixture that has been drawn into the shroud assembly may be exhausted at points around the shroud portion without having to travel through the entire extent of the shroud, which further minimises the residence time of the air-oil mixture in the shroud assembly.

According to a second aspect there is provided a bevel gearbox comprising a bevel gear shroud assembly according to the first aspect of the present invention.

According to a third aspect there is provided a gas turbine engine comprising a bevel gearbox according to the second aspect of the present invention.

According to a fourth aspect there is provided a method of minimising pumping losses in a bevel gear train comprising a pinion gear and a crown gear, the method comprising the steps of:
 (a) providing a bevel gear shroud assembly comprising a frustum shaped shroud portion having a cut-out sector, first and second rib portions projecting inwardly from, and normal to, respective upper and lower bases of the shroud portion, and one or more fin portions projecting inwardly from an inner surface of the shroud portion;
 (b) positioning the bevel gear shroud assembly over one of the crown gear and pinion gear, such that the cut-out sector is located over the mesh point of the pinion gear and the crown gear;
 (c) providing a supply of lubricant to a mesh point of the pinion gear and the crown gear; and
 (d) providing rotative drive to the pinion gear to thereby drive the crown gear.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 4:
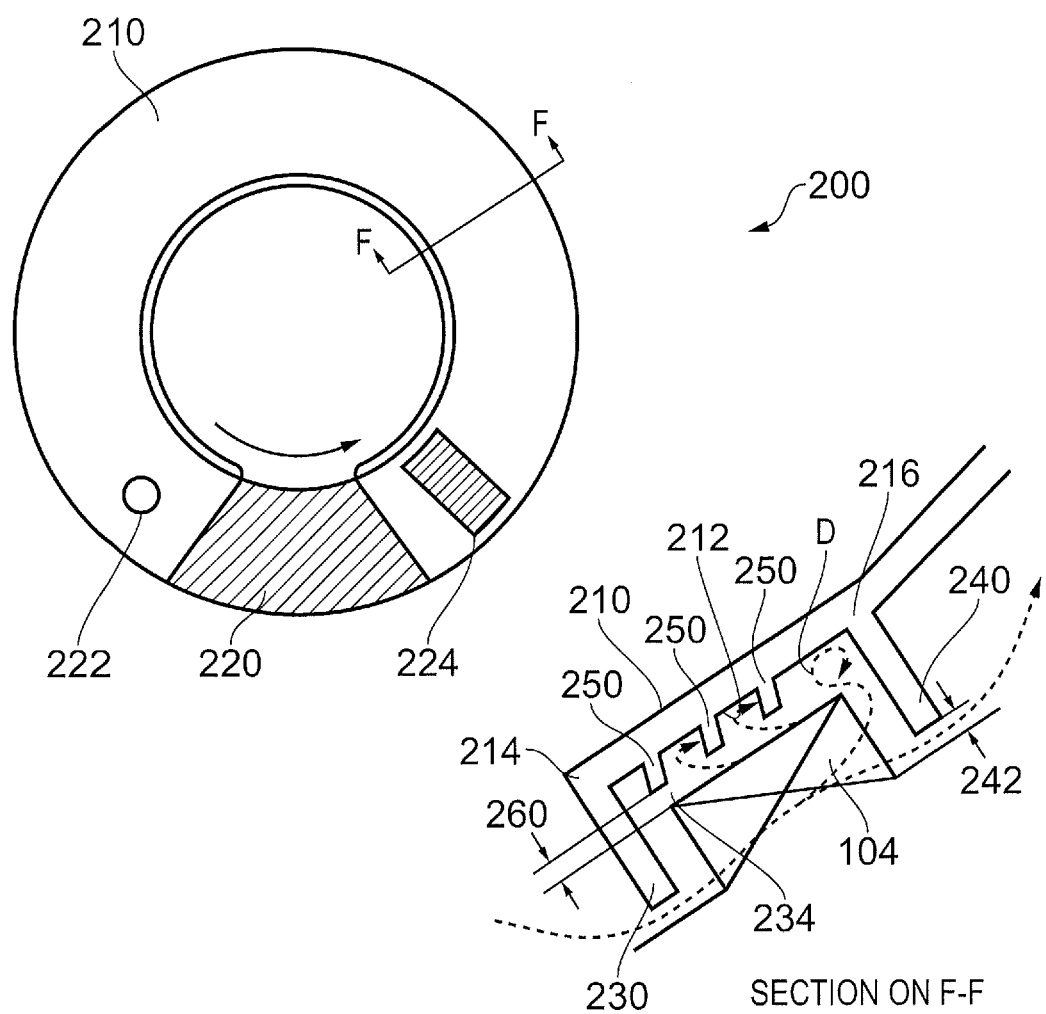
FIG. 4 shows a schematic sectional view of a bevel gear shroud assembly according to a first embodiment of the disclosure.

Referring to FIG. 4, a bevel gear shroud assembly according to a first embodiment is designated generally by the reference numeral 200. The bevel gear shroud assembly 200 comprises a shroud portion 210, first and second rib portions 230,240 and three fin portions 250.

The proposed arrangement replaces the conic inner surface of the prior art bevel gear shroud 100 with a ridged or finned surface 210 where the ridges or fins 250 run circumferentially around the shroud 210. The dimensions of the fins 250 are such that the required existing minimum gear to shroud mechanical clearance is maintained.

The shroud portion 210 is frustum shaped and has a cut-out sector 220. The shroud portion 210 has a frusto-conical form with an upper base 214 connected to a lower base 216 by a conical wall 211.

The first and second rib portions 230,240 project inwardly from and normal to, an inner surface 212 of the shroud portion 210. The first rib portion 230 is positioned at an upper base 214 of the shroud portion 210, and the second rib 240 is positioned at a lower base 216 of the shroud portion 210.

The radially inwardly projecting first and second rib portions 230,240 define an annular trough 234 extending circumferentially around the inner surface 212 of the conical wall 211 of the shroud portion 210.

In the embodiment of FIG. 4, each of the fin portions 250 projects inwardly from the inner surface 212 of the shroud portion 210 between the first and second rib portions 230, 240. Each of the fin portions 250 projects normally from the inner surface 212 of the shroud portion 210.

The arrangement of fin portions 250 of the embodiment of FIG. 4 defines an array of annular channels. The clearance between the gear teeth and the innermost edges of each of the fin portions 250 is arranged to be equal to or greater than the minimum gear tooth tip to gear shroud mechanical clearance from a prior art gear tooth assembly.

In the present arrangement the bevel gear shroud assembly 200 is formed from sheet metal with the shroud portion 210, rib portions 230,240, and fin portions 250 being discretely formed and subsequently joined together, using conventional metal forming and joining techniques.

Figure 1:
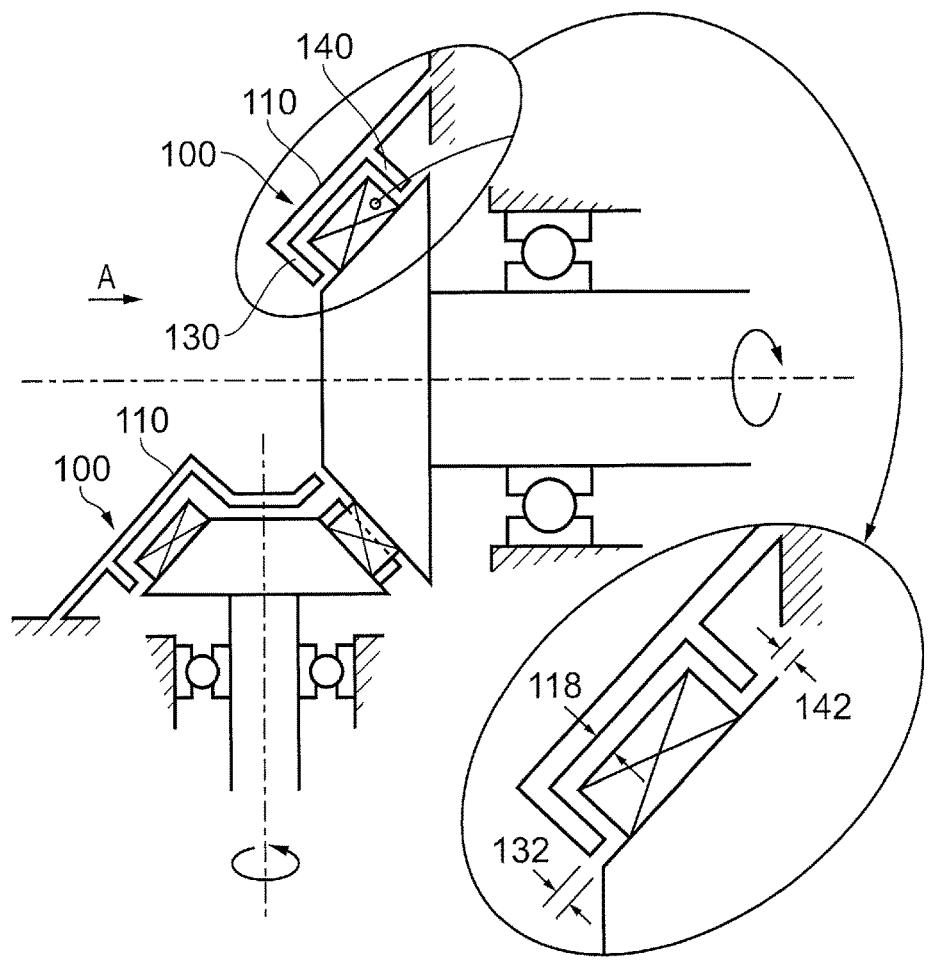
FIG. 1 shows a schematic sectional view of a bevel gear system and bevel gear shroud according to the prior art.
Figure 2:
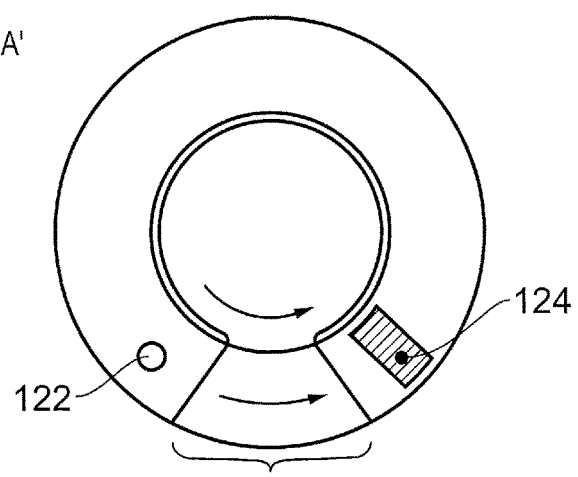
FIG. 2 shows a schematic partial view of the arrangement of FIG. 1.
Figure 3:
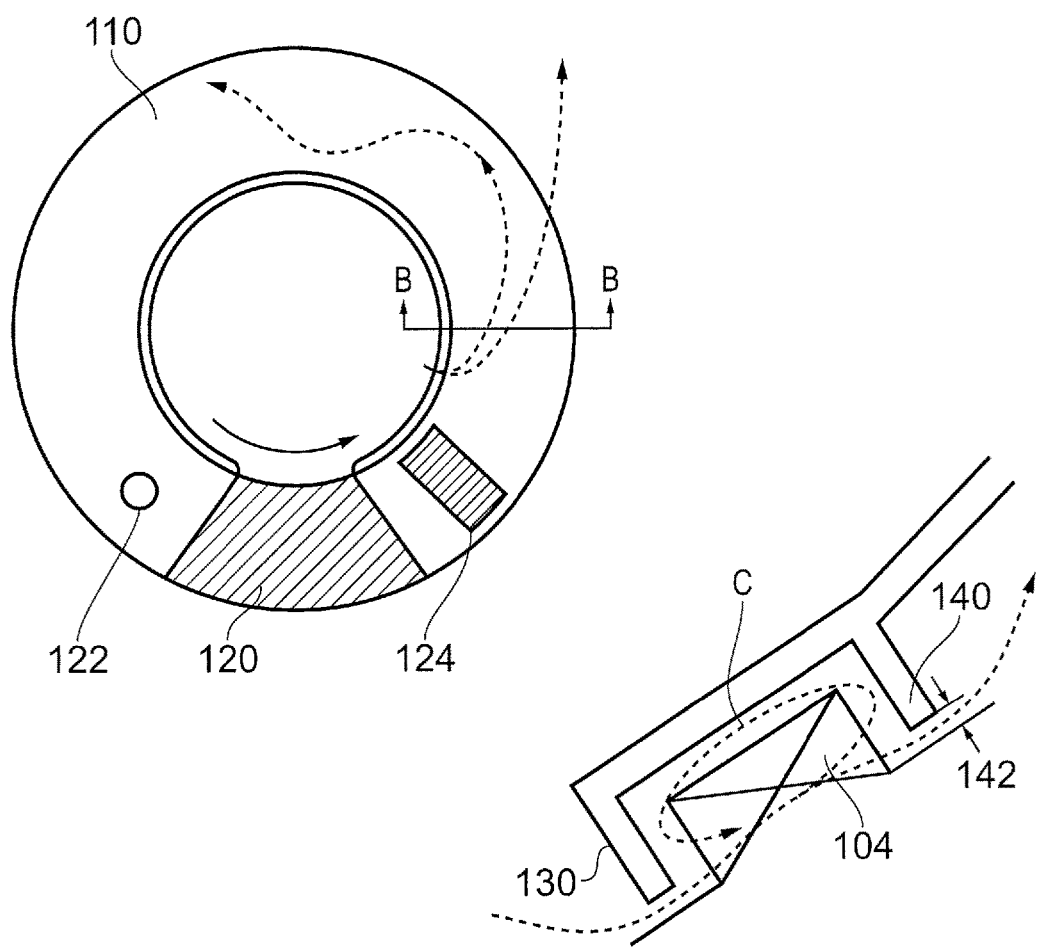
FIG. 3 shows a schematic view of the arrangement of FIG. 1 showing recirculation flows of the entrained air-oil mixture.

As indicated generally in FIG. 1, the bevel gear shroud assembly of FIG. 4 is intended to be attached to a bevel gear assembly and shielding one or other (or both) of the crown gear 102 and the pinion gear 104.

Consequently, the bevel gear assembly 200 further comprises a means of attachment (not shown) to the bevel gear assembly. This may take the form of integral tabs or brackets (not shown) or another conventional mechanical attachment means.

In an alternative arrangement, the bevel gear shroud assembly 200 is formed from fibre reinforced composite material. In this arrangement, the shroud portion 210, first and second rib portions 230,240 and the fin portions 250 are integrally moulded.

In use, an air-oil mixture is drawn into the shroud assembly 200 both via the cut-out sector 220 and via the clearance 232 at the radially innermost tip of the first rib portion 230. The air-oil mixture becomes divided between the channels defined by the fin portions 250 and is then drawn in a circumferential direction around the inner surface 212 of the shroud portion 210.

The fin portions 250 serve to direct the air-oil mixture circumferentially around the shroud portion 210 with the direction of rotation of the corresponding shrouded gear effecting the circumferential movement.

The air-oil mixture then exhausts the bevel gear shroud assembly through the cut-out sector.

By encouraging the air-oil mixture to follow a direct path into and out of the shroud portion 210, the shroud assembly 200 of the present disclosure minimises the residence time of the air-oil mixture in the gear tooth regions. This in turn minimise the quantity of heat that can be transferred to the oil.

Furthermore the pumping losses of the bevel gear assembly are minimised by restricting the interaction between the gear assembly and the air-oil mixture.

Figure 5:
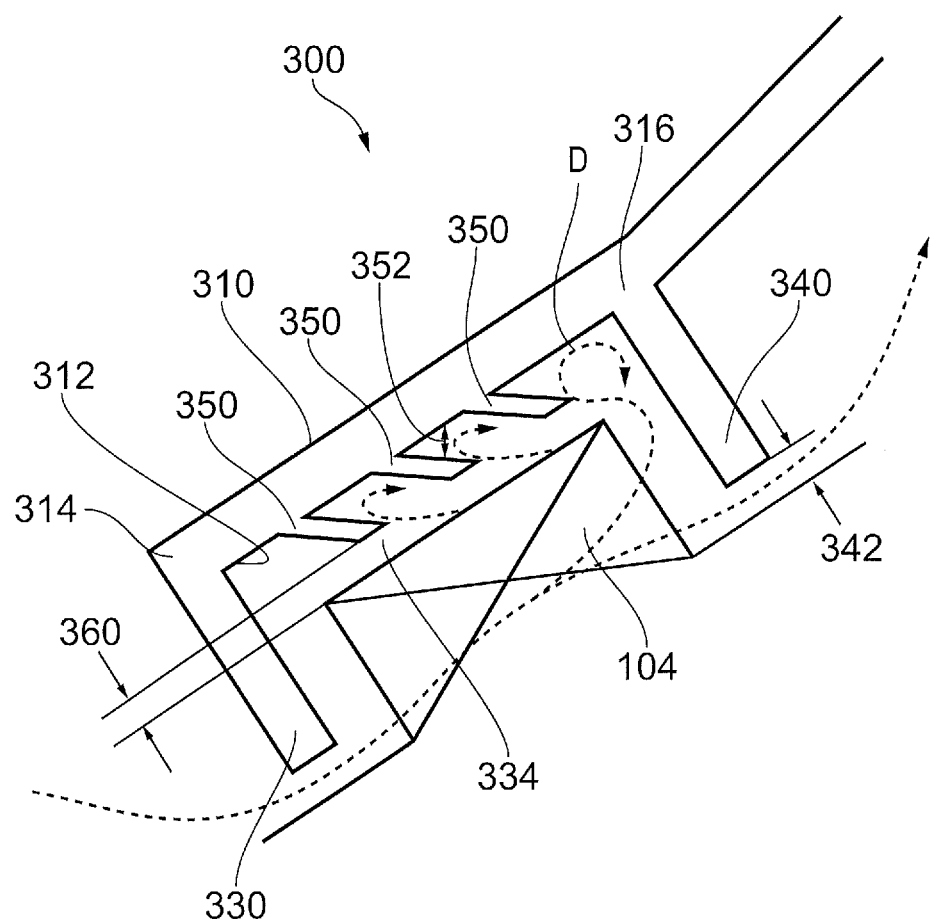
FIG. 5 shows a schematic sectional view of a bevel gear shroud assembly according to a second embodiment of the disclosure.

Referring to FIG. 5, a bevel gear shroud assembly according to a second embodiment is designated generally by the reference numeral 300. Features of the bevel gear shroud assembly 300 which correspond to those of the bevel gear shroud assembly 200 have been given corresponding reference numerals for ease of reference.

The bevel gear shroud assembly 300 comprises a shroud portion 310, first and second rib portions 330,340 and three fin portions 350.

The shroud portion 310 and the first and second rib portions 330,340 correspond to those described above in relation to the first embodiment.

In the embodiment of FIG. 5, the three fin portions 350 project inwardly from the inner surface 312 of the shroud portion 310, at an acute angle 352 to the inner surface 312, and angled towards the lower base 316 of the shroud portion 310.

In use the bevel gear shroud assembly 300 of this embodiment operates in the same manner as that described above in relation to the first embodiment 200.

The angled arrangement of the projecting fin portions 350 of this embodiment serve to better encourage the division of the air-oil mixture into the channels defined by the fin portions 350.

Figure 6:
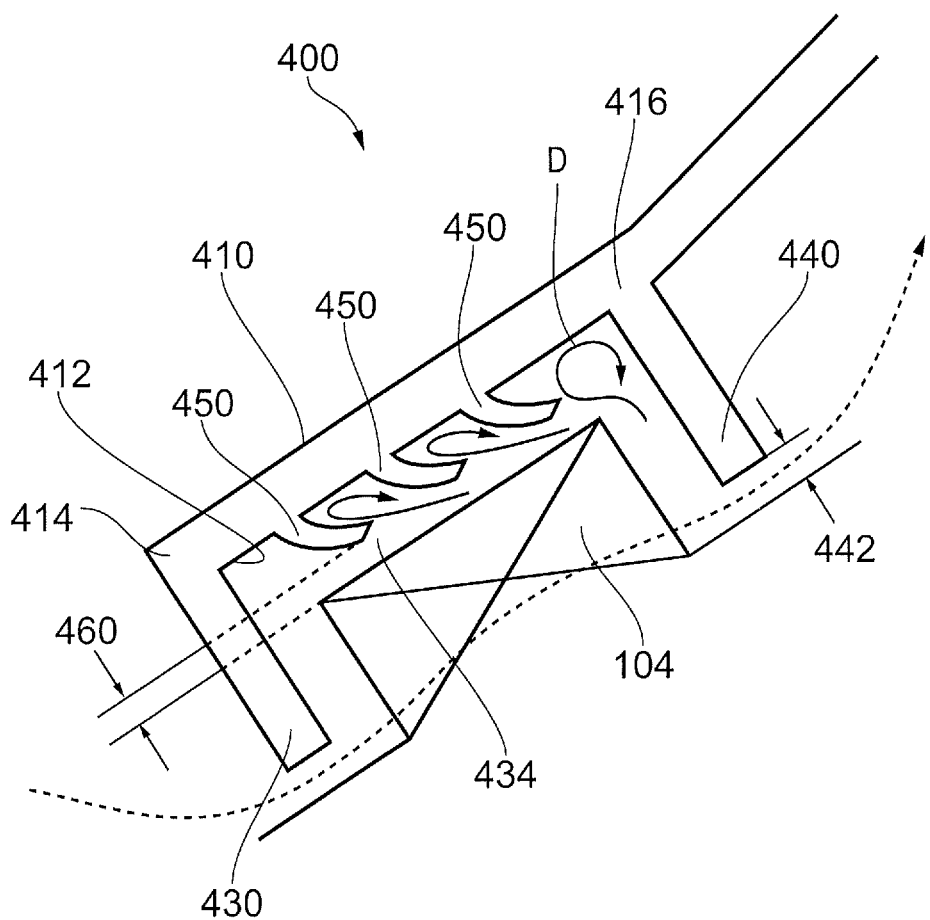
FIG. 6 shows a schematic sectional view of a bevel gear shroud assembly according to a third embodiment of the disclosure.

Referring to FIG. 6, a bevel gear shroud assembly according to a third embodiment is designated generally by the reference numeral 400. Features of the bevel gear shroud assembly 400 which correspond to those of the bevel gear shroud assembly 200 have been given corresponding reference numerals for ease of reference.

The bevel gear shroud assembly 400 comprises a shroud portion 410, first and second rib portions 430,440 and three fin portions 450.

The shroud portion 410 and the first and second rib portions 430,440 correspond to those of the first embodiment as previously described.

The three fin portions 450 of the present embodiment, project inwardly from the inner surface 412 of the shroud portion 410 and are each curved towards the lower base 416 of the shroud portion 410.

In use the bevel gear shroud assembly 400 of this embodiment functions in the same way as that of the first embodiment, which has been described above.

Figure 7:
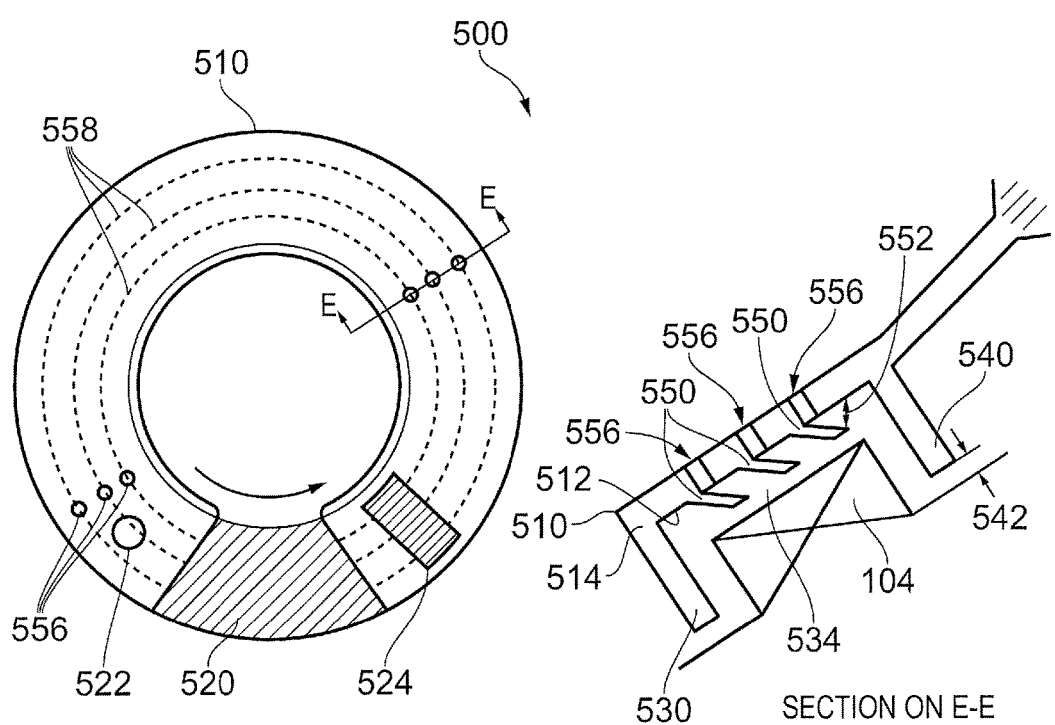
FIG. 7 shows a schematic sectional view of a bevel gear shroud assembly according to a third embodiment of the disclosure.

Referring to FIG. 7, a bevel gear shroud assembly according to a fourth embodiment is designated generally by the reference numeral 500. Features of the bevel gear shroud assembly 500 which correspond to those of the bevel gear shroud assembly 200 have been given corresponding reference numerals for ease of reference.

The bevel gear shroud assembly 500 of the fourth embodiment corresponds broadly to the second embodiment of the shroud assembly as described above.

In other words, the bevel gear shroud assembly 500 of the fourth embodiment comprises a shroud portion 510, first and second rib portions 530,540 and three fin portions 550.

Each of the three fin portions 550 projects inwardly from the inner surface 512 of the shroud portion 510, at an acute angle 552 to the inner surface 512, and are angled towards the lower base 516 of the shroud portion 510.

The fourth embodiment further comprises a plurality of exit ports 556 arranged in three circumferential arrays 558 around the shroud portion 510. As shown in FIG. 7, the exit ports 556 in each array 558 of exit ports 556 extend through the shroud portion 510 on a side of the corresponding fin portion 550 closest to the lower base 516 of the shroud portion 510.

The bevel gears shroud assembly 500 of the fourth embodiment operates in the same manner as that described above for the other embodiments of the assembly.

However, the presence of the arrays 558 of exit ports 556 allows the air-oil mixture that has been entrained within the shroud assembly 500 to exhaust from the assembly 500 as the air-oil mixture travels around an interior of the shroud assembly 500. This further minimises the residence time of the air-oil mixture in the shroud assembly 500 and so further limits the quantity of heat that can be transferred to the oil from the shrouded gear.

The features of the shroud assembly of the disclosure can also be applied to the interior of spur gear shrouds beneath the region of the shrouds covering the gear sides. In this way, the windage heat generation associated with the pumping effect of the gear sides would be reduced for a given gear to shroud minimum clearance.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A bevel gear shroud assembly comprising:
a frustum shaped shroud portion having a cut-out sector;
first and second rib portions; and
one or more fin portions,
wherein:
the first and second rib portions project inwardly from and normal to, an inner surface of the shroud portion, the first rib portion being positioned at an upper base of the shroud portion, and the second rib portion being positioned at a lower base of the shroud portion, and the or each fin portion projects inwardly from the inner surface of the shroud portion between the first and second rib portions, at an acute angle to the inner surface, and is angled towards the lower base of the shroud portion, and the or each fin portion extends around the shroud portion.

2. The bevel gear shroud assembly as claimed in claim 1, wherein the or each fin portion projects normally from the inner surface of the shroud portion.

3. The bevel gear shroud assembly as claimed in claim 1, wherein the or each fin portion projects from the inner surface of the shroud portion, and curves towards the lower base of the shroud portion.

4. The bevel gear shroud assembly as claimed in claim 1, wherein the or each fin portion extends circumferentially around the inner surface of the shroud portion.

5. The bevel gear shroud assembly as claimed in claim 1, wherein the or each fin portion extends spirally around the inner surface of the shroud portion.

6. The bevel gear shroud assembly as claimed in claim 1, wherein the or each fin portion is provided with at least one exit port extending through a wall of the shroud portion.

7. A bevel gearbox comprising the bevel gear shroud assembly as claimed in claim 1.

8. A gas turbine engine comprising the bevel gearbox as claimed in claim 7.

9. A method of minimising pumping losses in a bevel gear train comprising a pinion gear and a crown gear, the method comprising:
    (a) providing a bevel gear shroud assembly comprising a frustum shaped shroud portion having a cut-out sector, first and second rib portions projecting inwardly from, and normal to, respective upper and lower bases of the shroud portion, and one or more fin portions projecting inwardly from an inner surface of the shroud portion;
    (b) positioning the bevel gear shroud assembly over one of the crown gear and pinion gear, such that the cut-out sector is located over the mesh point of the pinion gear and the crown gear;
    (c) providing a supply of lubricant to a mesh point of the pinion gear and the crown gear; and
    (d) providing rotative drive to the pinion gear to thereby drive the crown gear.

\* \* \* \* \*